US007813923B2

(12) United States Patent
Acero et al.

(10) Patent No.: US 7,813,923 B2
(45) Date of Patent: Oct. 12, 2010

(54) CALIBRATION BASED BEAMFORMING, NON-LINEAR ADAPTIVE FILTERING, AND MULTI-SENSOR HEADSET

(75) Inventors: Alejandro Acero, Bellevue, WA (US); Michael L. Seltzer, Seattle, WA (US); Zhengyou Zhang, Bellevue, WA (US); Zicheng Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 680 days.

(21) Appl. No.: 11/251,164

(22) Filed: Oct. 14, 2005

(65) Prior Publication Data

US 2007/0088544 A1 Apr. 19, 2007

(51) Int. Cl.
*G10L 15/20* (2006.01)
*G10L 21/02* (2006.01)
*H04R 15/00* (2006.01)

(52) U.S. Cl. ......................... 704/233; 704/226; 381/92; 381/93

(58) Field of Classification Search ................. 704/226, 704/233; 381/92
See application file for complete search history.

(56) References Cited

U.S. PATENT DOCUMENTS

| | | | | |
|---|---|---|---|---|
| 5,012,519 | A | 4/1991 | Adlersberg et al. | |
| 5,353,376 | A * | 10/1994 | Oh et al. | 704/233 |
| 5,839,101 | A | 11/1998 | Vahatalo et al. | |
| 6,009,396 | A * | 12/1999 | Nagata | 704/270 |
| 6,041,127 | A | 3/2000 | Elko | |
| 6,289,309 | B1 | 9/2001 | deVries | |
| 6,643,619 | B1 | 11/2003 | Linhard et al. | |
| 6,778,954 | B1 | 8/2004 | Kim et al. | |
| 6,914,854 | B1 | 7/2005 | Heberley et al. | |
| 7,080,007 | B2 | 7/2006 | Son et al. | |
| 7,099,822 | B2 * | 8/2006 | Zangi | 704/226 |
| 7,139,711 | B2 | 11/2006 | Grover | |
| 7,167,568 | B2 * | 1/2007 | Malvar et al. | 381/66 |
| 7,174,022 | B1 * | 2/2007 | Zhang et al. | 381/92 |
| 7,366,658 | B2 | 4/2008 | Moogi et al. | |
| 7,415,117 | B2 | 8/2008 | Tashev et al. | |
| 7,565,288 | B2 | 7/2009 | Acero et al. | |
| 2002/0002455 | A1 | 1/2002 | Accardi et al. | |
| 2002/0069054 | A1 * | 6/2002 | Arrowood et al. | 704/233 |

(Continued)

OTHER PUBLICATIONS

Zheng et al. "Air and Bone conductive integrated microphones for robust speech detection and enhancement", IEEE workshop on automatic speech recognition and understanding, Dec. 2003.*

(Continued)

*Primary Examiner*—Vijay B Chawan
*Assistant Examiner*—Jialong He
(74) *Attorney, Agent, or Firm*—Christopher J. Volkmann; Westman, Champlin & Kelly, P.A.

(57) ABSTRACT

A first set of signals from an array of one or more microphones, and a second signal from a reference microphone are used to calibrate a set of filter parameters such that the filter parameters minimize a difference between the second signal and a beamformer output signal that is based on the first set of signals. Once calibrated, the filter parameters are used to form a beamformer output signal that is filtered using a non-linear adaptive filter that is adapted based on portions of a signal that do not contain speech, as determined by a speech detection sensor.

15 Claims, 7 Drawing Sheets

U.S. PATENT DOCUMENTS

| | | | | |
|---|---|---|---|---|
| 2002/0138254 | A1* | 9/2002 | Isaka et al. | 704/208 |
| 2003/0040908 | A1* | 2/2003 | Yang et al. | 704/233 |
| 2003/0055627 | A1* | 3/2003 | Balan et al. | 704/200.1 |
| 2003/0097257 | A1* | 5/2003 | Amada et al. | 704/208 |
| 2003/0177006 | A1 | 9/2003 | Ichikawa et al. | |
| 2003/0179888 | A1* | 9/2003 | Burnett et al. | 381/71.8 |
| 2003/0228023 | A1* | 12/2003 | Burnett et al. | 381/92 |
| 2004/0037436 | A1 | 2/2004 | Rui | |
| 2004/0049383 | A1 | 3/2004 | Kato et al. | |
| 2004/0071284 | A1* | 4/2004 | Abutalebi et al. | 379/406.08 |
| 2004/0111258 | A1* | 6/2004 | Zangi et al. | 704/226 |
| 2004/0175006 | A1 | 9/2004 | Kim et al. | |
| 2004/0230428 | A1 | 11/2004 | Choi | |
| 2005/0018861 | A1* | 1/2005 | Tashev | 381/92 |
| 2005/0195988 | A1 | 9/2005 | Tashev et al. | |
| 2005/0281415 | A1* | 12/2005 | Lambert et al. | 381/92 |
| 2006/0015331 | A1* | 1/2006 | Hui et al. | 704/227 |
| 2006/0122832 | A1* | 6/2006 | Takiguchi et al. | 704/240 |

OTHER PUBLICATIONS

Laugesen "Design of a microphone array for headsets", IEEE workshop on applications of signal processing to audio and acoustics, Oct. 2003.*

Seltzer "Microphone array processing for robust speech recognition", PhD thesis, Carnegie Mellong University, Jul. 2003.*

Deng et al. "Nonlinear information fusion in multi-sensor processing—extracting and exploiting hidden dynamics of speech captured by a bone-conductive microphone", IEEE workshop on multimedia signal processing, Oct. 1, 2004.*

Hann et al. "Filter bank design for subband adaptive microphone array", IEEE Trans. on Speech and Audio Processing, Jan. 2003.*

Tashev et al. "Microphone array for headset with spatial noise suppressor", Proc. of the 9$^{th}$ International Workshop on Acoustics Echo and Noise Control, Netherlands, Sep. 2005.*

Zicheng Liu, Michael L. Seltzer, Alex Acero, Ivan Tashev, Zhengyou Zhang, Mike Sinclair; "A Compact Multi-Sensor Headset for Hands-Free Communication", 2005 IEEE Workshop on Applications of Signal Processing to Audio and Acoustics, Oct. 17, 2005.

Hans Teutsch and Gary W. Elko; "An Adaptive Close-Talking Microphone Array", IEEE Workshop on Applications of Signal Processing to Audio and Acoustics, Oct. 21-24, 2001.

Yanli Zheng, Zicheng Liu, Zhengyou Zhang, Mike Sinclair, Jasha Droppo, Li Deng, Alex Acero, Xuedong Huang; "Air- and Bone-Conductive Integrated Microphones for Robust Speech Detection and Enhancement", IEEE Automatic Speech Recognition and Understanding Workshop, Dec. 2, 2003.

Michael L. Seltzer and Bhiksha Raj; "Speech-Recognizer-Based Filter Optimization for Microphone Array Processing", IEEE Signal Processing Letters, vol. 10, No. 3, pp. 69-71, Mar. 2003.

Jens Meyer, "Noise Cancelling For Microphone Arrays", IEEE, 1997, pp. 211-213.

Pascal Scalart, "Speech Enhancement Based on Priori Signal to Noise Estimation", IEEE, 1996, pp. 629-632.

C. Lai, P. Aarabi, "Multiple-Microphone Time-Varying Filters for Robust Speech Recognition", ICASSP 2004, Montreal, May 2004.

X. Zhang, Y. Jia, "A Soft Decision Based Noise Cross Power Spectral Density Estimation for Two-Microphone Speech Enhancement Systems", ICASSP 2005, Philadelphia, Mar. 2005.

I. Tashev, H. Malvar, "A New Beamformer Design Algorithm for Microphone Arrays", ICASSP 2005, Philadelphia, Mar. 2005.

Y. Ephraim, D. Malah, "Speech Enhancement Using a Minimum Mean-Square Error Short-Time Spectral Amplitude Estimator", IEEE Trans on Acoustics, Speech, and Signal Processing, vol. ASSP-32, No. 6, Dec. 1984.

P. J. Wolfe and S. J. Godsill, "Simple Alternatives to the Ephraim and Malah Suppression Rule for Speech Enhancement", In Proceedings of the IEEE workshop on Statistical Signal Processing, 2001, pp. 496-499.

H. S. Malvar, "A Modulated Complex Lapped Transform and its Applications to Audio Processing", ICASSP 99, Phoenix, Mar. 1999, pp. 1421-1424.

I. Tashev, "Gain Calibration Procedure for Microphone Arrays", ICME 2004, Taipei, Jun. 2004.

* cited by examiner

CALIBRATION BASED BEAMFORMING, NON-LINEAR ADAPTIVE FILTERING, AND MULTI-SENSOR HEADSET

BACKGROUND

The need for hands-free communication has led to an increased popularity in the use of headsets with mobile phones and other speech interface devices. Concerns for comfort, portability, and cachet have led to the desire for headsets with a small form factor. Inherent to this size constraint is the requirement that the microphone be placed farther from the user's mouth, generally increasing its susceptibility to environmental noise. This has meant a tradeoff between audio performance and useability features such as comfort, portability and cachet.

SUMMARY

A first set of signals from an array of one or more microphones, and a second signal from a reference microphone are used to calibrate a set of filter parameters such that the filter parameters minimize a difference between the second signal and a beamformer output signal that is based on the first set of signals. Once calibrated, the filter parameters are used to form a beamformer output signal that is filtered using a non-linear adaptive filter that is adapted based on portions of a signal that do not contain speech, as determined by a speech detection sensor.

A variety of other variations and embodiments besides those illustrative examples specifically discussed herein are also contemplated within the scope of the claims for the present invention, and will be apparent to those skilled in the art from the entirety of the present disclosure.

DETAILED DESCRIPTION OF ILLUSTRATIVE EMBODIMENTS

Figure 1:
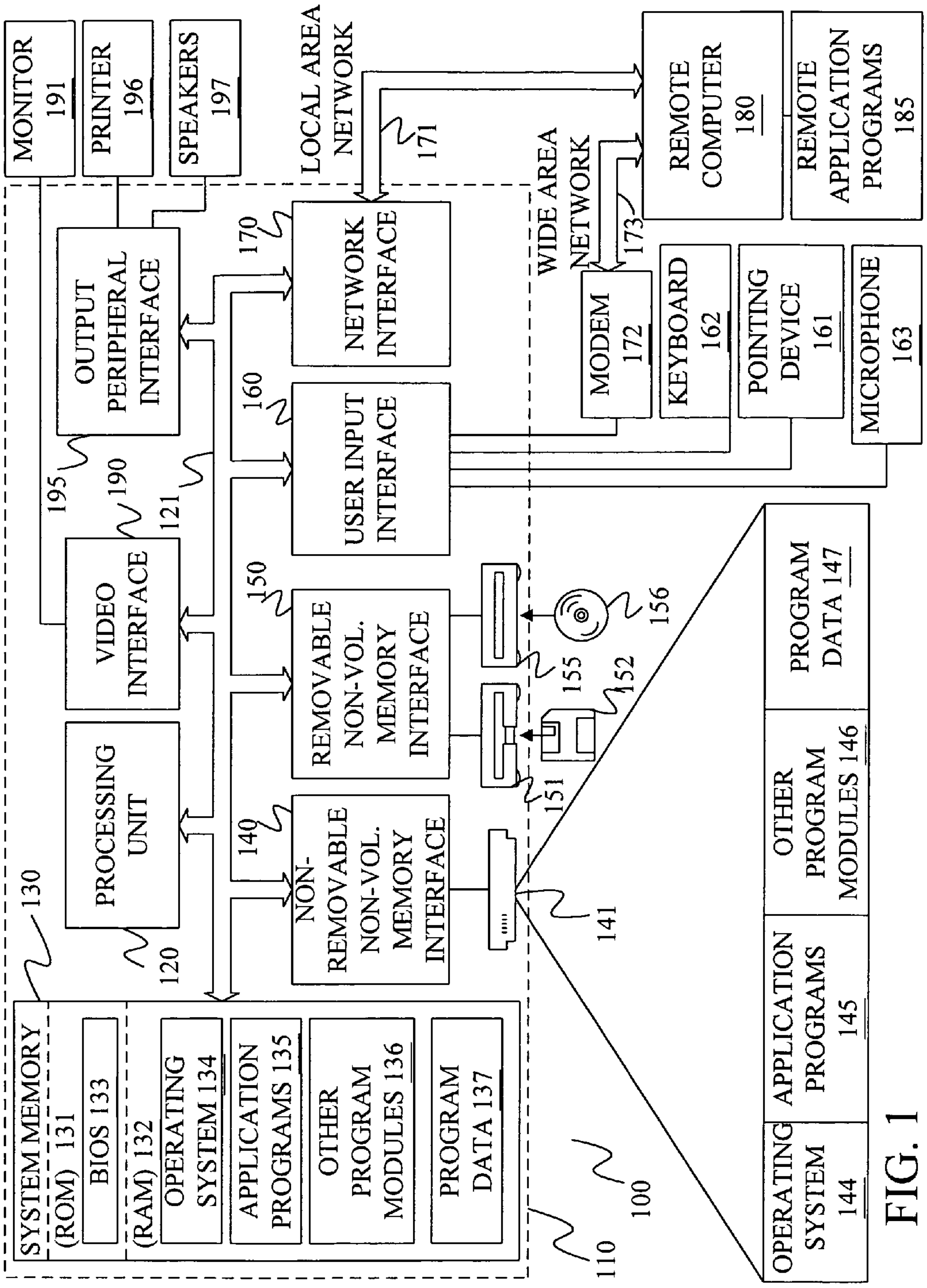
FIG. 1 provides a block diagram of a computing environment in which embodiments of the present invention may be practiced, according to one illustrative embodiment.

A variety of methods and apparatus are encompassed within different embodiments, an illustrative sampling of which are described herein. For example, FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the, same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
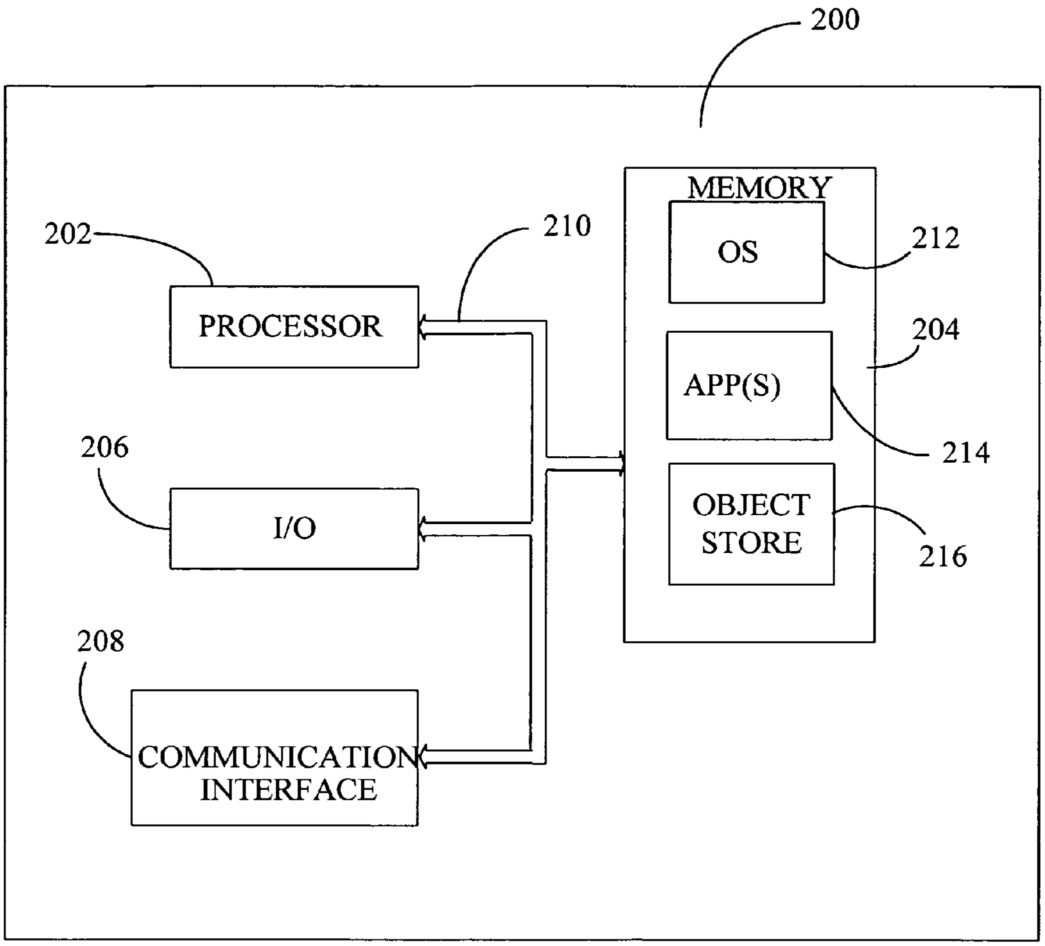
FIG. 2 provides a block diagram of another computing environment in which embodiments of the present invention may be practiced, according to one illustrative embodiment.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210. Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Multi-sensor Headset

Figure 3:
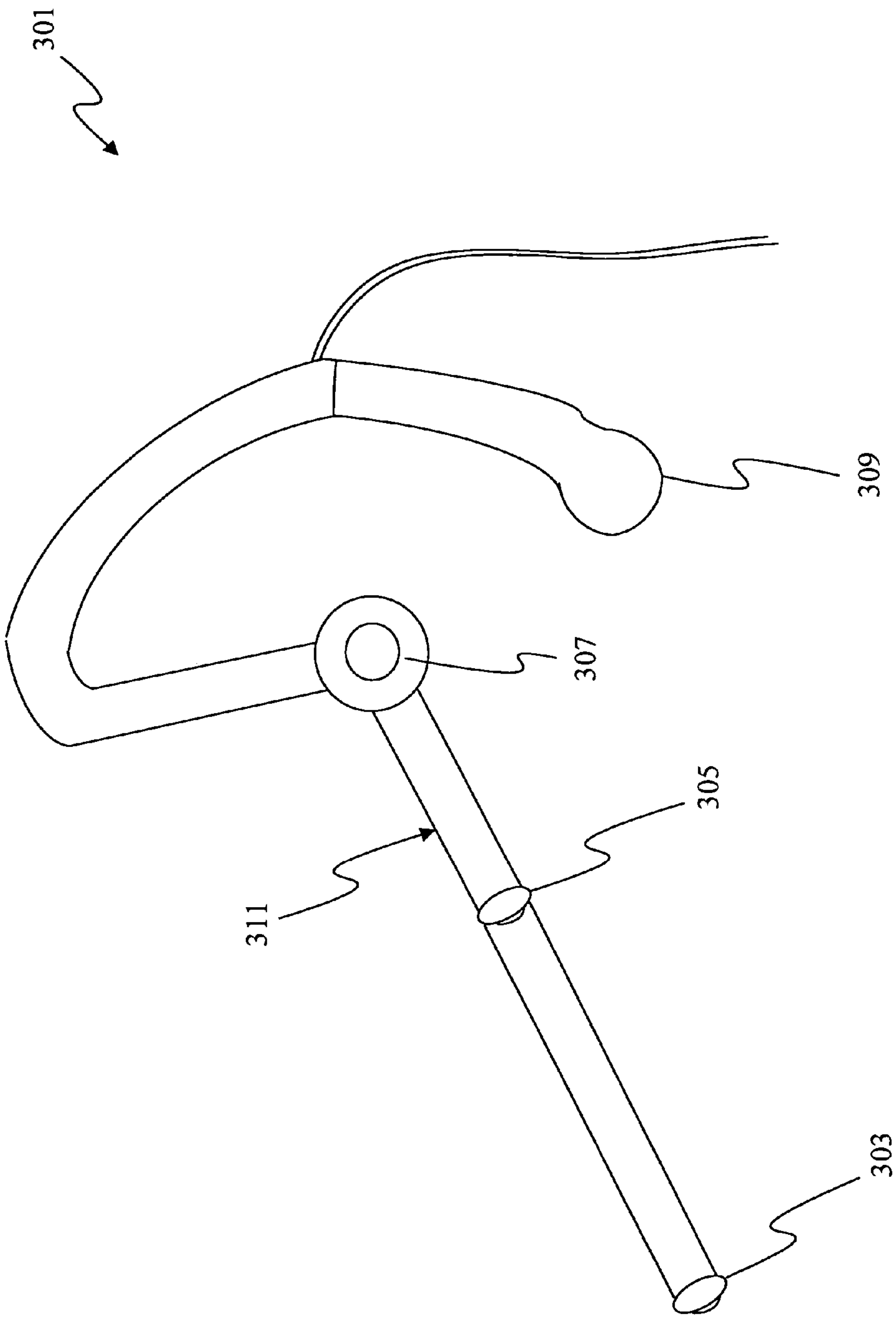
FIG. 3 depicts a multi-sensor headset, according to one illustrative embodiment.

FIG. 3 depicts a multi-sensor headset 301, according to one illustrative embodiment. Multi-sensor headset 301 comprises three air microphones 303, 305, 307 and a bone sensor 309, in this illustrative embodiment. The three air microphones 303, 305, 307 are placed along a short boom 311, forming a linear, directional array of microphones. The spacing between the first microphone 303 and the second microphone 305 is about 40 millimeters in this illustrative embodiment, and the spacing between the second microphone 305 and the third microphone 307 is about 25 millimeters, in this illustrative embodiment. A wide variety of other spacing distances, greater and smaller than these figures, may be used in other embodiments.

The first two air microphones 303, 305 are preferred-direction microphones and are noise-canceling. The third microphone 307 is omnidirectional; that is, it is not a preferred-direction microphone. Microphones 303 and 305 are configured to receive primarily the user's speech, while microphone 307 is configured to receive ambient noise, in addition to the user's speech. The omnidirectional third microphone 307 is thereby used both as part of the microphone array, and for capturing ambient noise for downstream adaptive filtering. This difference in function does not necessarily imply difference in structure; it is contemplated that all three microphones 303, 305, 307 are physically identical within normal tolerances in one illustrative embodiment, although their placement and orientation suit them particularly for their functions. Microphones 303 and 305 face toward the direction expected for the user's mouth, while microphone 307 faces in a direction expected to be directly away from the user's ear, thus making it more likely for microphone 307 to sample ambient noise in addition to the user's speech. Microphone 307 may be described as omnidirectional not because it receives sounds from every direction necessarily, but in the sense that it faces the user's ambient environment rather than being particularly aimed in a preferred direction toward a user's mouth.

Although each of microphones 303, 305, and 307 would each detect and include in their transmitted signals some finite inclusion of both speech and noise, the signal associated with the omnidirectional microphone 307 is designated separately as a speech plus noise signal since it is expected to feature a substantially greater noise-to-speech ratio than the signals received by the preferred-direction microphones 303 and 305.

Although this embodiment is depicted with one omnidirectional microphone 307 and two preferred-direction microphones in the microphone array, this is illustrative only, and many other arrangements may occur in various embodiments. For example, in another embodiment there may be only a single preferred-direction microphone and a single omnidirectional microphone; while in another example, three or more preferred-direction microphones may be included in an array; while in yet another embodiment, two or more omnidirectional microphones may be used—for example, to face two different ambient noise directions away from the user.

Regarding headset 301, the general direction of boom 311 defines a preferred direction for the directional array of microphones 303, 305, 307 as a whole, and particularly for microphones 303 and 305 individually. The headset 301 may be worn with the air microphones 303 and 305 oriented generally toward the user's mouth, and the microphone 307 oriented along a generally common line with microphones 303 and 305, in this embodiment. Omnidirectional microphone 307 is situated generally at the ear canal, in normal use, while the bone sensor 309 rests on the skull behind the ear. The bone-conductive sensor is highly insensitive to ambient noise, and as such, provides robust speech activity detection.

Bone sensor 309 is one example of a speech indicator sensor, configured for providing an indicator signal that is configured to indicate when the user is speaking and when the user is not speaking. Bone sensor 309 is configured to contact a user's head just behind the ear, where it receives vibrations that pass through the user's skull, such as those corresponding to speech. Other types of speech indicator sensors may occur in various embodiments, including a bone sensor configured to contact the user's jaw, or a throat microphone that measures the user's throat vibrations, as additional illustrative examples. A speech indicator may also take the form of a function of signal information, such as the audio energy received by the microphones. The energy level of the sensor signal may be compared to a stored threshold level of energy, pre-selected to match the threshold of energy anticipated for the user's speech. Microphones 303, 305, 307 are conventional air conduction microphones used to convert audio vibrations into electrical signals.

Headset Array Calibration

Figure 4:
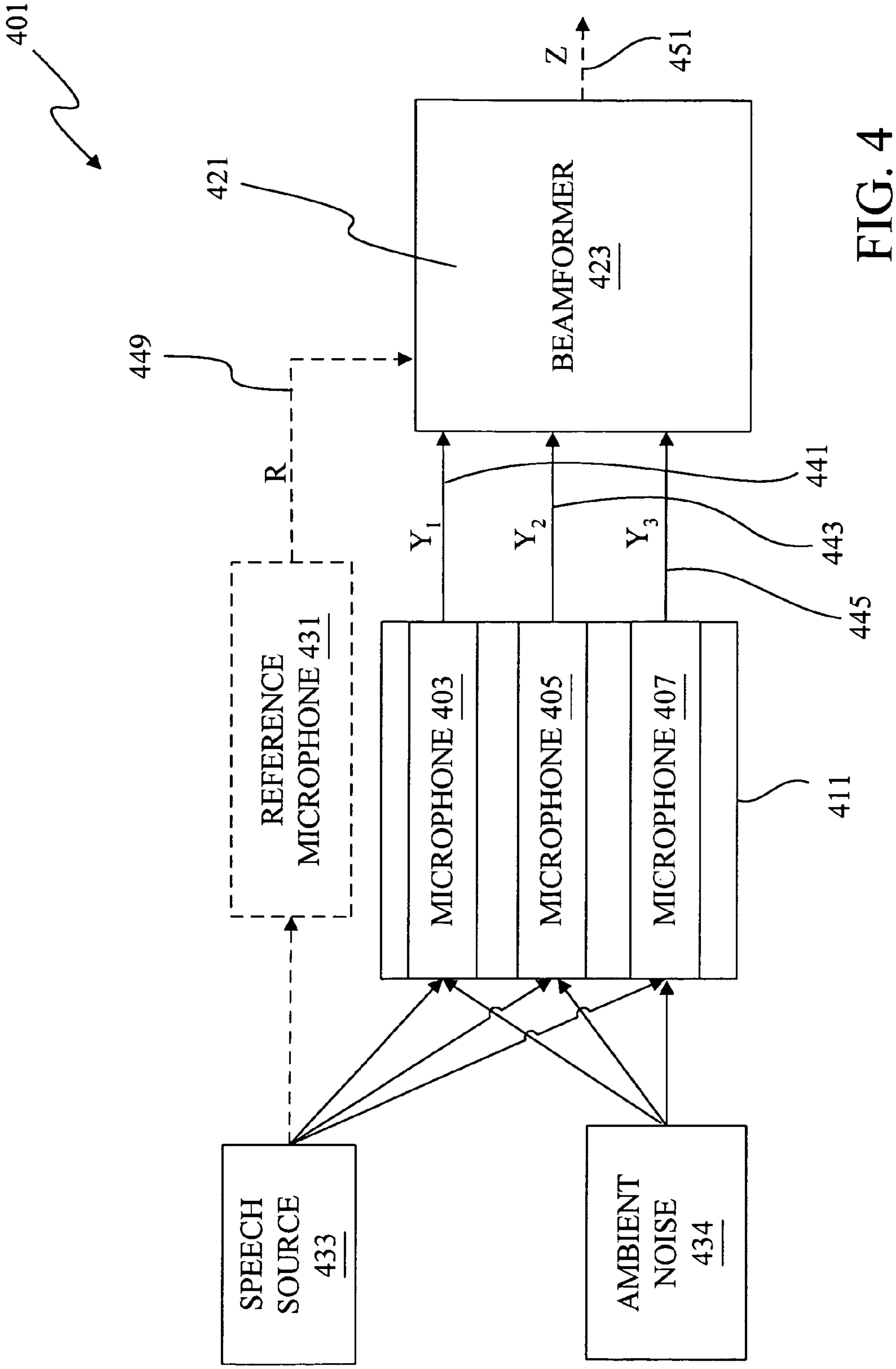
FIG. 4 depicts a block diagram of a noise reducing system, according to one illustrative embodiment.

FIG. 4 depicts a block diagram of a noise reducing system 401. In FIG. 4, a microphone array 411 that includes microphones 403, 405, and 407, receives speech from a speech source 433 and ambient noise 434. Based on the received signals, microphones 403, 405, and 407 produce output signals 441, 443, and 445, respectively. These signals are combined by a beamformer 423 by applying a filter to each signal and summing the filtered signals to form a noise-reduced output signal 451.

The filter parameters used by beamformer 423 are calibrated using a close-talking microphone reference signal 449, in one embodiment. Using a small sample of training recordings in which a user's speech is captured by both the microphone array 411 and a close-talking reference microphone 431, a calibration algorithm 421 associated with beamformer 423 operates to set the filters for the microphones of array 411. Close-talking microphone 431 is generally only used for calibration; then once system 401 is calibrated, reference microphone 431 is no longer needed, as suggested by the dashed lines associated with reference microphone 431.

Array 411 may form part of a headset, such as headset 301 of FIG. 3, or may be formed as part of a device to be held by the user or to stand apart from the user. As applied to an embodiment similar to headset 301 of FIG. 3, array 411 may be suspended on a headset pointing in the general direction of a user's mouth, though only extend a fraction of the distance to the mouth, while reference microphone 431 may be held closely to and directly in front of the user's mouth, to provide the clearest possible reference speech signal.

Figure 5:
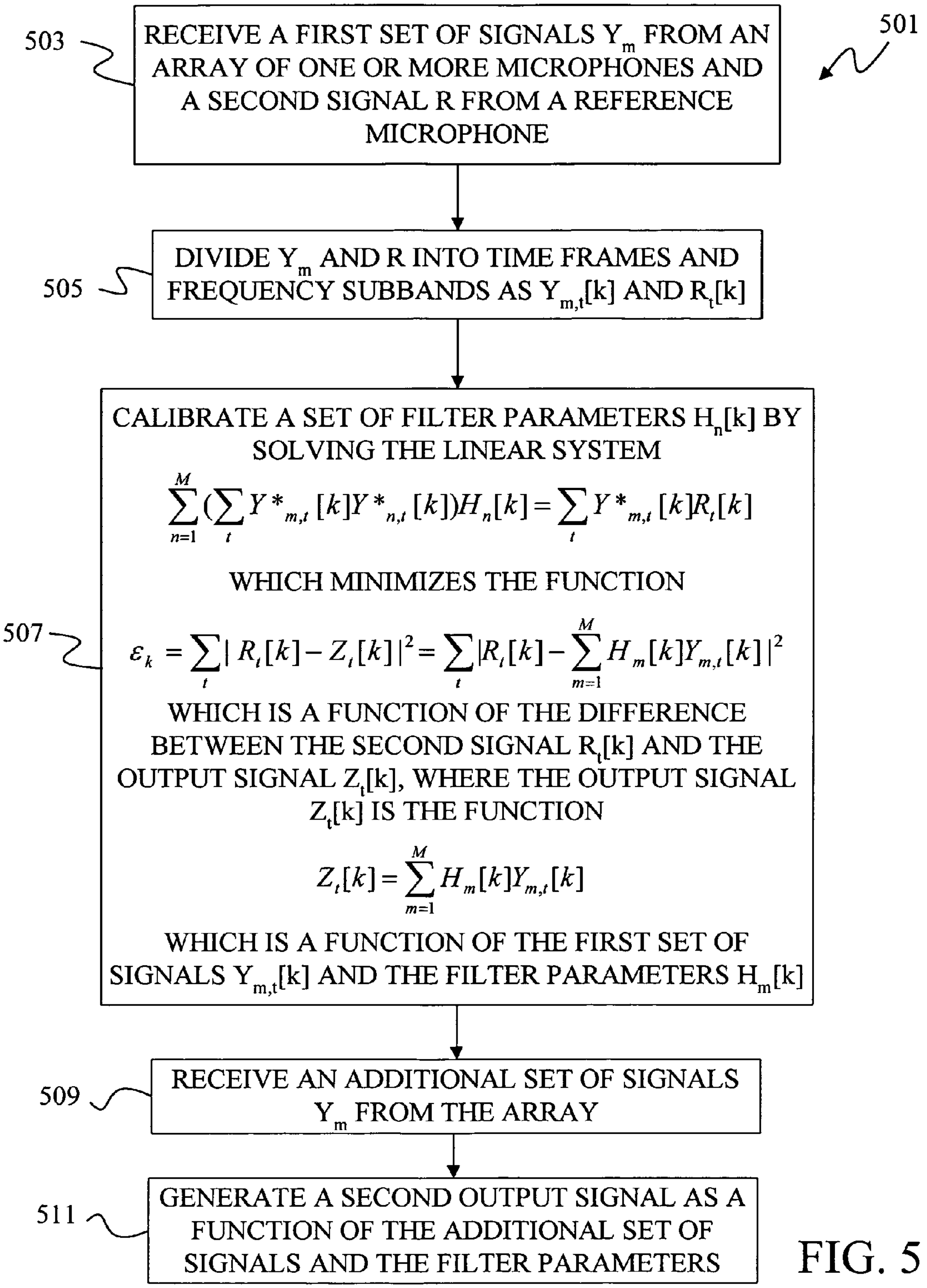
FIG. 5 depicts another flow diagram including a method that may be practiced with a noise-reducing system, according to one illustrative embodiment.

FIG. 5 shows a flow diagram depicting a method 501, for calibrating and using beamformer 423 to produce output signal 451. Step 503 includes receiving a first set of signals $Y_m$ from microphone array 411 and a second signal R from reference microphone 431.

Step 505 includes dividing $Y_m$ and R into time increments and frequency subbands as $Y_{m,t}[k]$ and $R_t[k]$. These steps may include additional details such as in one illustrative embodiment that might include conversion of the signals from analog to digital form, dividing the signals into time-domain samples, performing fast Fourier transforms on these time-domain samples, and thereby providing a signal in the form of subbands of frequency-domain frames.

In one illustrative example, analog-to-digital converters sample the analog signals at 16 kHz and 16 bits per sample, thereby creating 32 kilobytes of speech data per second. These digital signals are provided in new frames every 10 milliseconds, each of which includes 20 milliseconds worth of data. In this particular embodiment, therefore, the time-domain samples are partitioned in increments of 20 milliseconds each, with each frame overlapping the previous frame by half. Alternative embodiments may use increments of 25 milliseconds, or a timespan anywhere in a range from substantially less than 20 milliseconds to substantially more than 25 milliseconds. The frequency-domain frames may also occur in different forms. With each frame overlapping the previous frame by half, the number of subbands is designated here as N/2, where N is the size of a Discrete Fourier Transform (DFT).

These or other potential method steps will be recognized by those skilled in the art as advantageously contributing to embodiments similar to method 501. Some of the details of some of these and other potential method steps are also understood in the art, and need not be reviewed in detail here.

At step 507, the time-ordered frames and frequency subbands of the array signals $Y_{m,t}[k]$ and the reference signal $R_t[k]$ are used to calibrate a set of filter parameters $H_n[k]$ for beamformer 423. This involves solving a linear system which minimizes a function of the difference between the reference signal $R_t[k]$ and the output signal $Z_t[k]$, which is a function of the set of signals $Y_{m,t}[k]$ from the array, and the filter parameters $H_n[k]$. This linear system and these functions are explained as follows.

Calibration Algorithm

In the illustrative example of the subband filter-and-sum linear forming architecture, the kth subband of short-time Fourier transform of the signal produced by microphone m at frame t is represented as $Y_{m,t}[k]$, and the beamformer output can be expressed as:

$$Z_t[k] = \sum_{m=1}^{M} H_m[k] Y_{m,t}[k] \qquad \text{Eq. 1}$$

where $H_m[k]$ is the filter coefficient applied to subband k of microphone m and M is the total number of microphones in the array. If the reference signal from the close-talking microphone 431 is defined as $R_t[k]$, the goal of the proposed calibration algorithm is to find the array parameters that minimize the following objective function:

$$\varepsilon_k = \sum_t |R_t[k] - Z_t[k]|^2 = \sum_t \left| R_t[k] - \sum_{m=1}^{M} H_m[k] Y_{m,t}[k] \right|^2 \qquad \text{Eq. 2}$$

Equation 2 is therefore a function of the difference between the reference signal $R_t[k]$ and the beamformer output signal $Z_t[k]$. Minimizing this function is therefore a method of minimizing the difference between the output $R_t[k]$ from a reference microphone 431 and the beamformer output signal $Z_t[k]$ produced by a beamformer 423, applying calibration parameters or filter coefficients $H_m[k]$ derived from the present method to signals $Y_{m,t}[k]$ from a headset microphone array 411, according to one illustrative embodiment. Minimizing the function of Equation 2 may be done by taking the partial derivative of Equation 2 with respect to $H^*_m[k]$, where $H^*_m[k]$ represents the complex conjugate of $H_m[k]$, and setting the result to zero; this gives $$\sum_t \left( R_t[k] - \sum_{n=1}^{M} H_n[k] Y_{n,t}[k] \right) Y^*_{m,t}[k] = 0 \qquad \text{Eq. 3}$$

where $Y^*_{m,t}[k]$ is the complex conjugate of $Y_{m,t}[k]$. By rearranging the terms of Equation 3, this becomes:

$$\sum_{n=1}^{M} \left( \sum_t Y^*_{m,t}[k] Y^*_{n,t}[k] \right) H_n[k] = \sum_t Y^*_{m,t}[k] R_t[k] \qquad \text{Eq. 4}$$

The filter coefficients $\{H_1[k], \ldots, H_M[k]\}$ can then be found by solving the linear system in Equation 4, as represented in step 507 of method 501 of FIG. 5. In particular, a separate equation similar to Equation 4 is formed for each microphone. These separate equations are then solved simultaneously to determine the values for the filter coefficients. This optimization is performed over all subbands $k=\{1 \ldots N/2\}$, where N is the Discrete Fourier Transform (DFT) size.

Method 501 can thereby include minimizing the function $\epsilon_k$ of the difference between the reference signal $R_t[k]$ and the beamformer output signal $Z_t[k]$, including by taking the derivative of the function $\epsilon_k$ with respect to the complex conjugate $H^*_m[k]$ of the filter parameters $H_m[k]$, setting the derivative equal to zero, and solving the resulting linear system, as in Equation 4 and as depicted in step 507.

With the filter parameters $H_m[k]$ calibrated, beamformer 423 is ready to receive a new set of signals $Y_{m,t}[k]$ from the array 411 at step 509. These new signals are then used to generate an output signal $Z_t[k]$ 451 as a function of the new set of signals and the stored filter parameters $H_m[k]$, as depicted in step 511 of method 501.

Non-Linear Adaptive Filtering

The calibrated beamformer will generally not be able to remove all possible ambient noise from the signal. To reflect this, the beamformer output Z may be modeled as:

$$Z_t = G_Z X_t + H_{Z,t} V_t \qquad \text{Eq. 5}$$

where $G_Z$ is the spectral tilt induced by the array, $V_t$ is the ambient noise, and $H_Z$ is the effective filter formed by the beamforming process.

Figure 6:
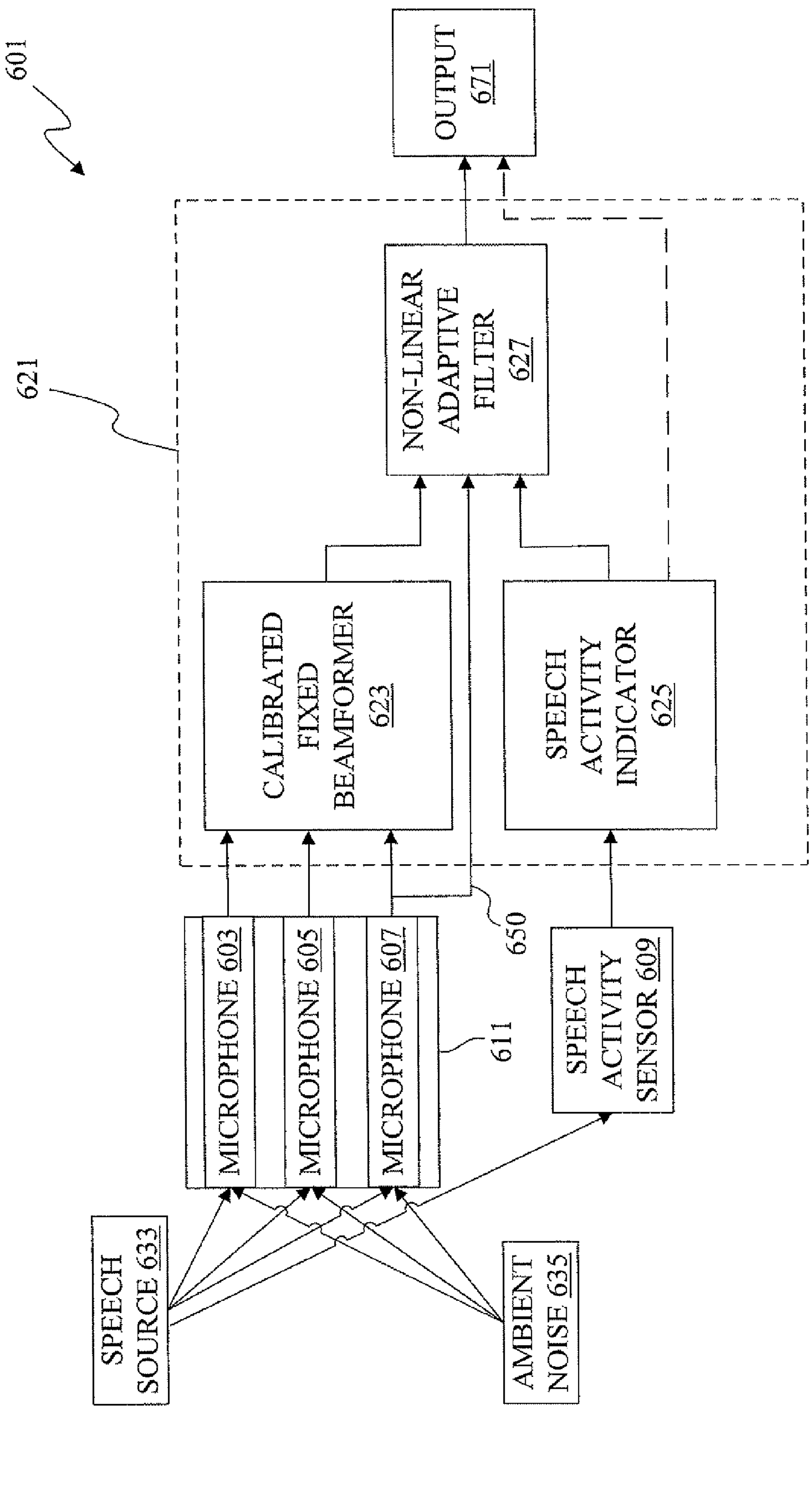
FIG. 6 depicts a block diagram of a noise reducing system, according to one illustrative embodiment.
Figure 7:
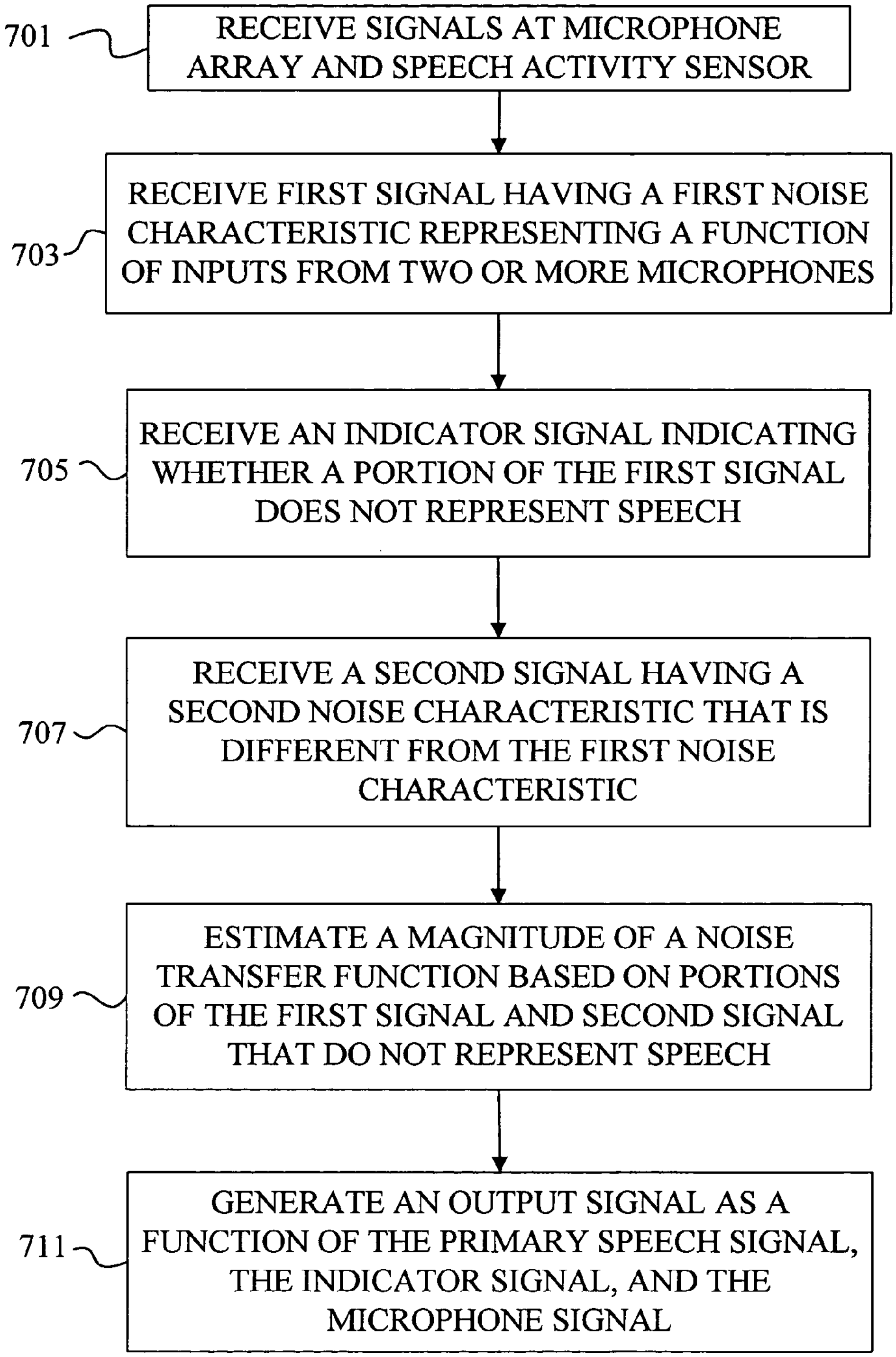
FIG. 7 depicts a flow diagram including a method for generating a noise-reduced output signal, according to one illustrative embodiment.

To further enhance the output signal, a non-linear adaptive filter may be applied to the output of the calibrated beamformer. This filter relies on noise information from an omni-directional microphone and exploits the precise speech activity detection provided by a speech indicator sensor, such as the particular example of the bone-conductive sensor 309 in the illustrative embodiment in FIG. 3. This combined system of calibrated beamforming followed by non-linear adaptive filtering is depicted in FIG. 6, according to one illustrative embodiment. A method for performing beamforming followed by adaptive filtering is shown in the flow diagram of FIG. 7.

In system 601 of FIG. 6, audio signals from speech source 633, such as the user's voice, are received by microphones 603, 605, 607 of array 611. Audio signals corresponding to ambient noise 635 are also received by microphones 603, 605, 607—although microphone 607 is especially oriented to receive ambient noise, while microphones 603 and 605 face a preferred direction in which the boom on which they are attached is pointed. Based on these audio signals, microphones 603, 605, and 607 generate electrical signals that are provided to a calibrated beamformer 623 at step 701 of FIG. 7. During step 701, a speech activity sensor 609 also provides an electrical signal to a speech activity indicator 625. In some embodiments, speech activity sensor 609 is a type of sensor, such as bone-conduction sensor 309 of FIG. 3, which is not sensitive to ambient noise but does produce a strong signal when the user is speaking. In other embodiments, rather than being an external component, speech activity sensor 609 is a means for using signal information for evaluating whether the signal corresponds to speech, such as if the signal exceeds a level of energy anticipated for the user's speech. In whatever form, this allows the signal from speech activity sensor 609 to be used to determine when the user is speaking.

At step 703, beamformer 623 uses the signals from microphones 603, 605, and 607 in equation 1 above to form a first signal having a specified noise characteristic. This first signal is a beamform primary speech signal, having a noise characteristic that represents a function of the signals from microphones 603, 605, and 607, for example. At step 705, speech activity indicator 625 uses the signal from speech activity sensor 609 to indicate whether a portion of the first signal does not represent speech, or which portions of the primary speech signal contain the user's speech. In one method performed in association with speech activity indicator 625, the energy level of the sensor signal is compared to a stored threshold level of energy, pre-selected to distinguish between speech and the absence of speech as calibrated to the specific instrument, to determine if the user is speaking.

Instead of using a separate speech activity sensor, other embodiments detect when the user is speaking using the microphone array 611. Under one embodiment, the overall rate of energy being detected by the array of microphones, may be used to determine when the user is speaking. Alternatively, the rate of energy being detected by a directional array of microphones from a source coinciding with a preferred direction of the array may be used to determine when the user is speaking. Either of these may be calibrated to provide a fairly effective indication of the occurrence or absence of the user's speech. Additional types of speech activity sensors besides these illustrative examples are also contemplated in various embodiments.

Speech activity indicator 625, provides an indicator signal to non-linear adaptive filter 627 to indicate when the user is speaking. Non-linear adaptive filter 627 also receives the primary speech signal output from beamformer 623, which is formed using equation 1 above, and microphone signal 650 from microphone 607, constituting a second signal having a second noise characteristic, at step 707. Microphone 607 is oriented to serve as an omnidirectional microphone rather than a preferred-direction microphone, and the second signal is anticipated to have a noise characteristic with a greater component of ambient noise.Filter 627 uses these signals to perform non-linear adaptive filtering. This includes estimating a magnitude of a noise transfer function based on portions of the first signal and second signal that do not represent speech, as depicted in step 709. Filter 627 then generates a filtered output signal as a function of the primary speech signal, the indicator signal, and microphone signal 650, as depicted in step 711. An example of such a mechanism is presented as follows, according to one illustrative embodiment. With $Y_o$ defined as the omnidirectional microphone signal 650, this signal can be modeled as:

$$Y_{o,t}=G_oX_t+H_{o,t}V_t \quad \text{Eq. 6}$$

The following additional variables may also be defined as follows:

$$\tilde{X}_t=G_oX_t \quad \text{Eq. 7}$$

$$\tilde{V}_t=H_{o,t}V_t \quad \text{Eq. 8}$$

$$\tilde{G}_Z=G_Z/G_o \quad \text{Eq. 9}$$

$$\tilde{H}_{Z,t}=H_{Z,t}/H_{o,t} \quad \text{Eq. 10}$$

Substituting Equations 7-8 into Equations 5 and 6 gives:

$$Z_t=\tilde{G}_Z\tilde{X}_t+\tilde{H}_{Z,t}\tilde{V}_t \quad \text{Eq. 11}$$

$$Y_{o,t}=\tilde{X}_t+\tilde{V}_t \quad \text{Eq. 12}$$

In essence, $\tilde{G}_Z$ is the signal transfer function between the beamformer output and the omnidirectional microphone, while $\tilde{H}_{Z,t}$ is the corresponding noise transfer function.

$\tilde{H}_{Z,t}$ in equation 11 is a function of time. However, if this variation over time is modeled as strictly a function of its phase, while its magnitude is relatively constant, then $\tilde{H}_{Z,t}$ may be rewritten as:

$$\tilde{H}_{Z,t}=|\tilde{H}_Z|e^{j\phi t} \quad \text{Eq. 13}$$

If the speech X and the noise V can be modeled to be uncorrelated, equations 11-13 can be combined to obtain:

$$|Z_t|^2=|\tilde{G}_Z|^2|\tilde{X}_t|^2+|\tilde{H}_Z|^2|\tilde{V}_t|^2 \quad \text{Eq. 14}$$

$$|Y_{o,t}|^2=|\tilde{X}_t|^2+|\tilde{V}_t|^2 \quad \text{Eq. 15}$$

Solving for $|\tilde{X}_t|^2$ using these two equations leads to:

$$|\tilde{X}_t|^2=\frac{|Z_t|^2-|\tilde{H}_Z|^2|Y_{o,t}|^2}{|\tilde{G}_Z|^2+|\tilde{H}_Z|^2} \quad \text{Eq. 16}$$

Because the denominator of Equation 16 is constant over time, it acts simply as a gain factor. Therefore, $|\tilde{X}_t|^2$ (after accounting for the gain factor) can be estimated simply as:

$$|\tilde{X}_t|^2=|Z_t|^2-|\tilde{H}_Z|^2|Y_{o,t}|^2 \quad \text{Eq. 17}$$

This leads to an estimate of the magnitude of $\tilde{X}_t$ as:

$$|\tilde{X}_t|=|Z_t|\sqrt{\max\left(1-\frac{|\tilde{H}_Z|^2|Y_{o,t}|^2}{|Z_t|^2},\ \varepsilon\right)} \quad \text{Eq. 18}$$

where ϵ is a small constant and the square-root value represents an adaptive noise suppression factor. As can be seen, the noise suppression factor is a function of the microphone signal $Y_{o,t}$ and $|\tilde{H}_Z|^2$ which forms an effective filter coefficient. As in other magnitude-domain noise suppression algorithms, e.g. spectral subtraction, the phase of the beamformer output signal Z may be used for the filter output as well. Thus, the final estimate of $\tilde{X}$ is:

$$\tilde{X}_t=|\tilde{X}_t|e^{j\angle Z_t} \quad \text{Eq. 19}$$

where $j\angle Z_t$ represents the phase of $Z_t$.

$|H_Z|$ is estimated using non-speech frames, which are identified based on the signal from speech activity indicator 625. In these frames, Equations 14 and 15 simplify to:

$$|Z_t|^2=|\tilde{H}_Z|^2|\tilde{V}_t|^2 \quad \text{Eq. 20}$$

$$|Y_{o,t}|^2=|\tilde{V}_t|^2 \quad \text{Eq. 21}$$

Using these expressions, the least-squares solution for $|\tilde{H}_Z|$ is:

$$|\tilde{H}_Z| = \frac{\sum_t |Z_t||Y_{o,t}|}{\sum_t |Y_{o,t}|^2} \quad \text{Eq. 22}$$

In other embodiments, the primary speech signal is formed using a delay-and-sum beamformer, that delays one or more signals in a microphone array and then sums the signals. Specifically, the primary speech signal is formed using a function that incorporates a time delay in superposing signals from the microphones of the microphone array 611 to enhance signals representing sound coming from a source in a preferred direction relative to the array. That is, the function may impose a time shift on the signals from each microphone in the array prior to superposing their signals into a combined signal.

For example, with reference once more to FIG. 3, microphones 303 and 305 were placed about 40 millimeters apart, and microphones 305 and 307 were placed about 25 millimeters apart, all three along a single line segment, in that illustrative embodiment. The speed of sound in the Earth's atomsphere under normal conditions of temperature and pressure is approximately 335 meters per second. Therefore, as an audio signal travels through the air from a source in the preferred direction of array 311, such as from the source of the user's voice, the audio signal will reach microphone 305 approximately (0.040 m/335 m/s~) 120 microseconds after reaching microphone 303, and reach microphone 307 approximately (0.025 m/335 m/s~) 75 microseconds after reaching microphone 305 and 195 microseconds after reaching microphone 303. Therefore, if the function superposes the signals of all three of these microphones after delaying the signals from microphone 303 by 195 microseconds, the signals from microphone 305 by 75 microseconds, and not delaying the signals from microphone 307, the function should constructively superpose the signals representing the speech source, while destructively interfering with signals sourced from outside the preferred direction of the array, thereby substantially reducing much of the ambient noise.

In the systems of FIGS. 4 and 6 above, the beamformer filter parameters must be fixed before the beamformer can be used to identify a primary speech signal. This training of the filter parameters may be performed at the factory or by the user. If the training is performed at the factory using a headset embodiment as shown in FIG. 3, differences in the head size of the trainer and the eventual user will result in less than ideal performance in the beamformer. To address this, in some embodiments, different headsets may be provided in a variety of morphologies to conform to the sizes and shapes of the heads of a variety of different users, providing a specialized fit for each user. A set of array coefficients may be calibrated with reference to these particular and/or customized headset morphologies. A codebook of beamformers may be provided in which each codeword corresponds to a certain physical user profile. Calibration then includes searching for the codeword, or weighted combination of codewords, that provides the best match for a particular user.

Embodiments of calibrated beamformers, non-linear adaptive filters and associated processes, and devices embodying these new technologies, such as those illustrative embodiments illustrated herein, also have useful applicability to a wide range of technologies. They are applicable in combination with a broad range of additional microphone array processing methods and devices.

These are indicative of a few of the various additional features and elements that may be comprised in different embodiments corresponding to the claims herein. Although the present invention has been described with reference to particular illustrative embodiments, workers skilled in the art will recognize that changes may be made in form and detail without departing from the metes and bounds of the claimed invention.

What is claimed is:

1. A computer-implemented method comprising:

receiving an array signal based at least in part on two or more microphone signals generated by two or more microphones positioned in a directional array, the two or more microphones facing in a preferred direction;

receiving an ambient signal from an ambient microphone that is positioned in the directional array, the ambient microphone facing a direction other than the preferred direction;

receiving an indicator signal indicating one or more non-speech time intervals wherein portions of the array signal received during the non-speech time intervals do not represent speech;

evaluating a beamformer signal based at least in part on the array signal and the ambient signal;

evaluating a noise transfer function based at least in part on one or more portions of the beamformer signal received during the non-speech time intervals indicated by the indicator signal, and one or more portions of the ambient signal received during the same non-speech time intervals, wherein a noise suppression factor is based at least in part on the noise transfer function, the one or more portions of the ambient signal received during the non-speech time intervals, and the beamformer signal; and generating an output signal based at least in part on a product of the beamformer signal and the noise suppression factor that is based at least in part on the noise transfer function.

2. The computer-implemented method of claim 1 wherein one or more of the microphones are positioned on a headset.

3. The computer-implemented method of claim 1, wherein the array signal is formed by incorporating a time delay in superposing signals from the microphones in the directional array, based on the relative positions of the microphones in the directional array.

4. The computer-implemented method of claim 1 wherein the array signal is formed by filtering each microphone signal from the microphones in the directional array based on a microphone-specific filter value to form filtered signals, and summing the filtered signals.

5. The computer-implemented method of claim 4, further comprising determining the microphone-specific filter values by minimizing a function of a difference between a reference signal from a close-talking microphone and a beamformer signal formed using the microphone signals from the directional array and the ambient signal.

6. The computer-implemented method of claim 1, wherein generating the output signal comprises using a phase of the array signal as a phase of the output signal.

7. The computer-implemented method of claim 1, wherein the indicator signal is based at least in part on a signal from a speech indicator sensor.

8. The method of claim 7, wherein the speech indicator sensor comprises a bone sensor.

9. The method of claim 1, wherein the microphone signal on which the ambient signal is based is also one of the microphone signals on which the array signal is based.

10. An apparatus comprising:

a headset having an array of microphones and a speech activity sensor configured to provide indications of the absence of speech, wherein the array of microphones comprises at least two microphones positioned in a directional array facing in a preferred direction and at least one ambient microphone that is positioned in the directional array facing a direction other than the preferred direction, wherein the at least two microphones facing in the preferred direction are configured to generate an array signal and the at least one ambient microphone facing the direction other than the preferred direction is configured to generate an ambient signal;

a beamformer component that receives the array signal and the ambient signal from the array of microphones and applies filter parameters to each of the signals to produce a beamformer signal; and a non-linear adaptive filter component that receives the beamformer signal from the beamformer component, the ambient signal from the at least one ambient microphone, and an indicator signal from the speech activity sensor, wherein the non-linear adaptive filter component evaluates a noise transfer function based on one or more portions of the beamformer signal received during non-speech time intervals indicated by the indicator signal and one or more portions of the ambient signal received from the at least one ambient microphone during the same non-speech time intervals, wherein the non-linear adaptive filter component generates an output signal based at least in part on a product of the beamformer signal and a noise suppression factor, the noise suppression factor being based at least in part on the noise transfer function, the one or more portions of the ambient signal received during the non-speech time intervals, and the beamformer signal.

11. The apparatus of claim 10, wherein the speech activity sensor comprises a bone sensor.

12. The apparatus of claim 10, wherein the array signal is formed by incorporating a time delay in superposing signals from the at least two microphones in the directional array, based on the relative positions of the at least two microphones in the directional array.

13. The apparatus of claim 10, wherein the array signal is formed by filtering each microphone signal from the at least two microphones in the directional array based on a microphone-specific filter value to form filtered signals, and summing the filtered signals.

14. The apparatus of claim 10, wherein generating the output signal comprises using a phase of the array signal as a phase of the output signal.

15. The apparatus of claim 10, wherein the non-linear adaptive filter component receives the ambient signal from the ambient microphone independent from the array signal generated by the array of microphones and received by the beamformer component.

* * * * *